US008730923B2

(12) United States Patent
Andrews et al.

(10) Patent No.: US 8,730,923 B2
(45) Date of Patent: May 20, 2014

(54) METHOD FOR CONTROLLING RESOURCE ALLOCATION IN A WIRELESS COMMUNICATION SYSTEM

(75) Inventors: Daniel Matthew Andrews, New Providence, NJ (US); Qi Bi, Morris Plains, NJ (US); Frances Jiang, Whippany, NJ (US); Aleksandr Stolyar, Basking Ridge, NJ (US); Yang Yang, Parsippany, NJ (US)

(73) Assignee: Alcatel Lucent, Paris (FR)

( * ) Notice: Subject to any disclaimer, the term of this patent is extended or adjusted under 35 U.S.C. 154(b) by 766 days.

(21) Appl. No.: 10/459,010

(22) Filed: Jun. 11, 2003

(65) Prior Publication Data

US 2004/0253940 A1   Dec. 16, 2004

(51) Int. Cl.
*H04J 3/00*   (2006.01)

(52) U.S. Cl.
USPC ......... 370/336; 370/347; 455/452.2; 455/405

(58) Field of Classification Search
USPC ....................................................... 370/345
See application file for complete search history.

(56) References Cited

U.S. PATENT DOCUMENTS

| 6,088,344 | A  | * | 7/2000  | Wales et al. .................... 370/329 |
| 6,404,776 | B1 | * | 6/2002  | Voois et al. .................... 370/468 |
| 6,983,153 | B2 | * | 1/2006  | Jain et al. ....................... 455/453 |
| 7,107,061 | B1 | * | 9/2006  | Tontiruttananon et al. ... 455/453 |
| 7,366,202 | B2 | * | 4/2008  | Scherzer et al. .............. 370/480 |
| 2003/0188318 | A1 | * | 10/2003 | Liew et al. ....................... 725/93 |
| 2004/0090916 | A1 | * | 5/2004  | Hosein .......................... 370/235 |
| 2004/0208183 | A1 | * | 10/2004 | Balachandran et al. . 370/395.21 |
| 2011/0200017 | A1 | * | 8/2011  | Amalfitano .................... 370/335 |

* cited by examiner

*Primary Examiner* — German J Viana Di Prisco
(74) *Attorney, Agent, or Firm* — Carlson, Gaskey & Olds

(57) ABSTRACT

A resource allocation algorithm identifies a resource hogger in a wireless communication system data sharing arrangement and control shared resource overuse by the resource hogger. In one embodiment, the base station for a given sector in the system tracks the time-slot usage of each active user in the sector. If the usage for any user reaches a predetermined hogger threshold, normal target QoS enforcement is suspended for that user to allow more time slots to be allocated to the other, non-hogger users. When the resource hogger user's usage falls below the threshold, target QoS enforcement is returned to that user. Temporarily suspending target QoS enforcement for resource hoggers and allocating the remaining resources to other users prevents resource hoggers from deteriorating performance of the entire system.

13 Claims, 3 Drawing Sheets

METHOD FOR CONTROLLING RESOURCE ALLOCATION IN A WIRELESS COMMUNICATION SYSTEM

BACKGROUND OF THE INVENTION

1. Field of the Invention

The present invention relates to wireless communication systems.

2. Description of the Related Art

Wireless communication systems rely on data sharing arrangements to allow multiple users to share common resources. As shown in FIG. 1, the wireless system 100 has a plurality of base stations 102, each base station 102 acting as a communications hub for a particular coverage area, or sector 104.

Active users 106 within a given sector 104 share common resources. Each base station 102 may employ a resource assignment algorithm to ensure that the resources are fairly distributed among the users 106. Wireless systems often use a time slot-based resource sharing channel in a forward link of the system to allocate resources. More particularly, a scheduler algorithm in the base station 102 allocates time slot resources to all active users 106 in the sector 104, assigning one user 106 per time slot.

If quality of service (QoS) requirements are imposed in the wireless system, control over fair resource distribution can become more difficult. As is known in the art, QoS requirements ensure that users receive a minimum acceptable level of service. The scheduler will try to meet the QoS requirements regardless of operating conditions, such as RF conditions, encountered by each user. Due to the dynamics of each user's operation condition, however, users in poor operation conditions may degrade overall utilization of system resources in the wireless system. Large portions of the time slot's resources may be allocated to users in poor operation conditions to help those users reach their QoS requirements, but doing so takes resources away from other users and degrade their experience. This reallocation can cause the entire system to have poor performance, especially if taking resources away from users in good conditions fails to improve service for users in poor conditions. Resource overuse by "resource hoggers," such as users in poor conditions, can offset any expected benefits of enforcing QoS requirements in a time-based resource sharing system.

There is a desire for a system that can control resource overuse in a time-slot division wireless communication system with QoS enforcement.

SUMMARY OF THE INVENTION

The present invention is directed to a method that can identify a resource hogger in a wireless communication system data sharing arrangement having QoS enforcement. An algorithm tracks time-slot usage of each active user in a sector and suspends QoS enforcement temporarily for any user whose usage reaches a predetermined resource hogger threshold.

If the usage for any user reaches a predetermined hogger threshold, it indicates that the user is using a disproportionate amount of the shared resources. The invention suspends normal QoS enforcement for the resource hogger user to allow more time slots to be allocated to the other, non-hogger users. When the resource hogger user's usage falls below the threshold, QoS enforcement is returned to that user.

By temporarily suspending QoS enforcement for resource hoggers and allocating the remaining resources to other users, the invention prevents resource hoggers from causing poor performance in the entire system.

DETAILED DESCRIPTION

Figure 1:
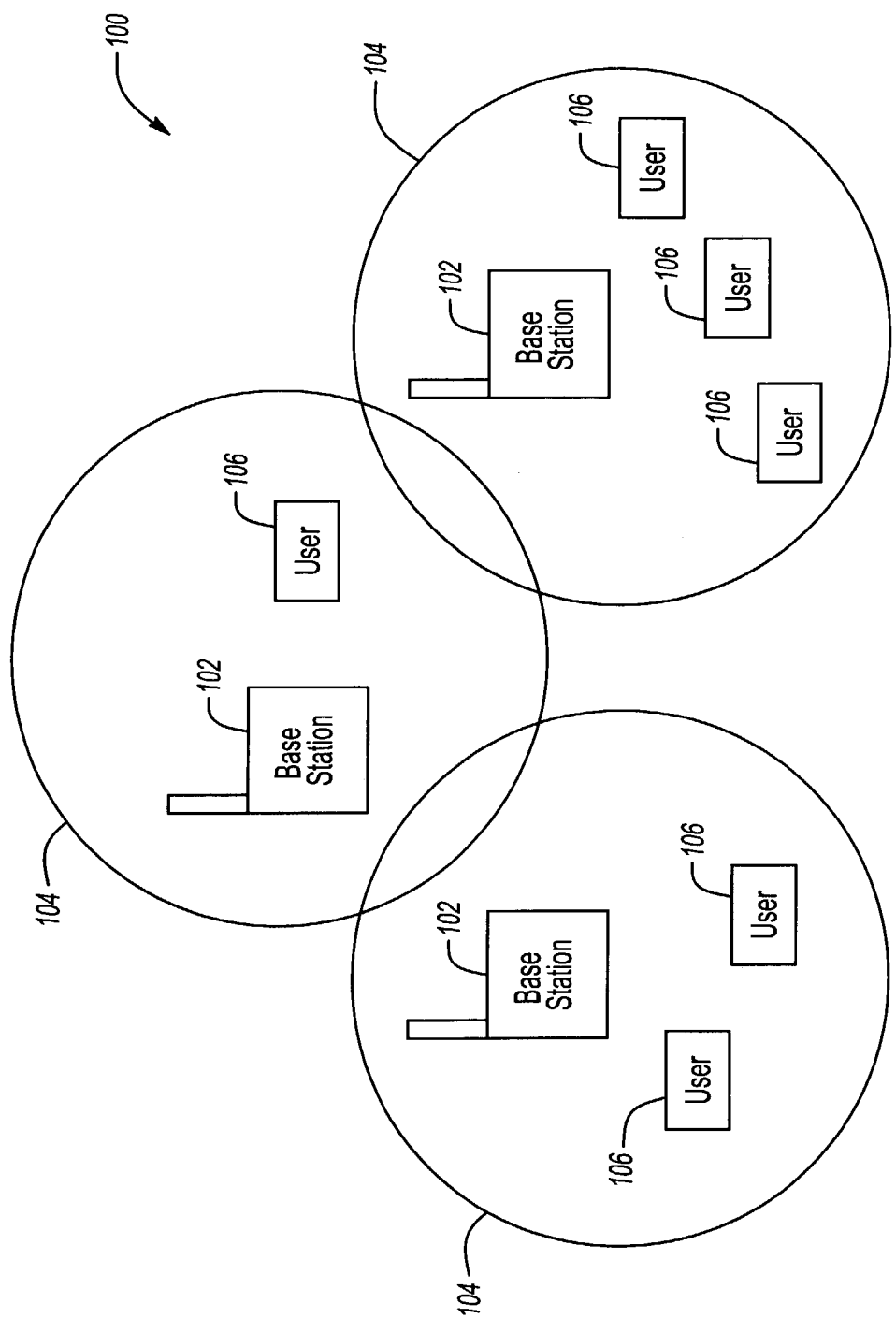
FIG. 1 is a representative diagram of an operating environment of the present invention.
Figure 2:
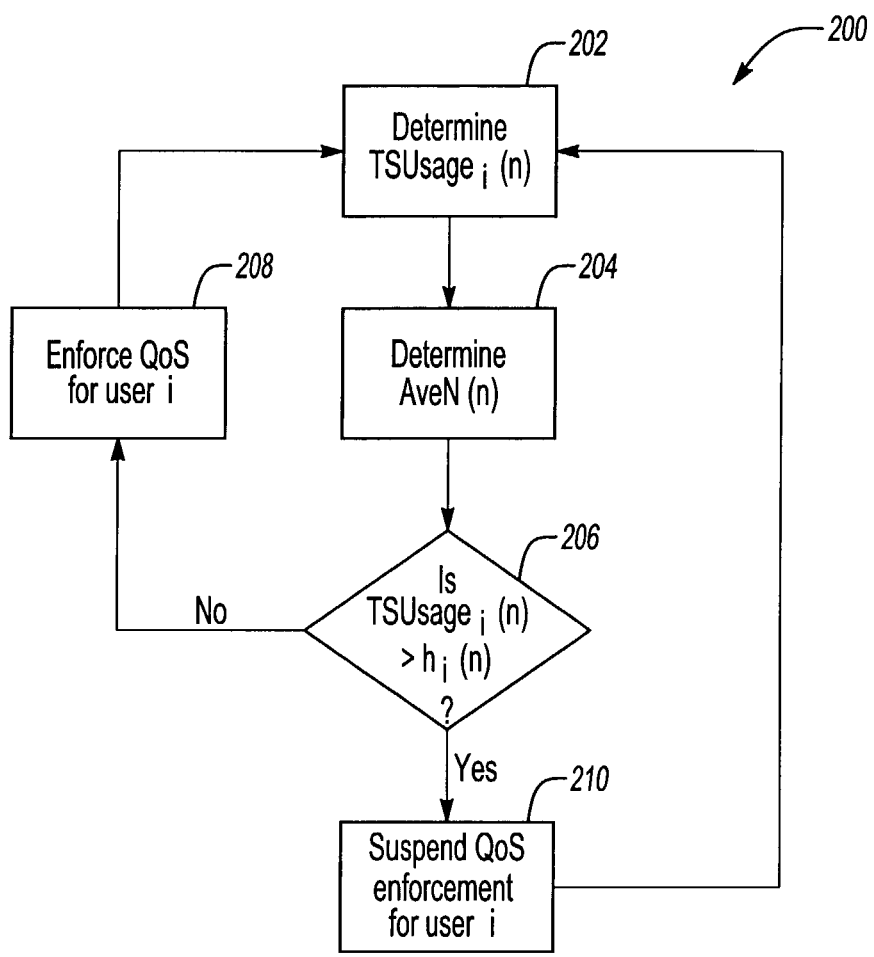
FIG. 2 is a flow diagram illustrating a resource control method according to one embodiment of the invention.

FIG. 2 is a flow diagram illustrating one embodiment of the inventive resource control method. The method may be implemented in the base station 102 of the wireless communication system 100 as an algorithm. The inventive method can be used in any system using time-slot based resource sharing.

Generally, the inventive method allows the users to share common resources while maintaining an acceptable overall QoS in the system. As noted above, a scheduler allocates time slot resources to each user (e.g., one time slot per user) via a resource assignment algorithm to ensure that the resources are fairly distributed among the users 106. QoS requirements imposed on the system requires the base station to try to meet certain target service levels for the users 106, but different operational conditions among the users 106 may cause certain users 106 in poor conditions to use more than their fair share of common resources to meet the QoS requirements for themselves. More particularly, users in poor conditions cannot be served as easily as users in good conditions and therefore require more resources, often at the expense of other users in the sector, to meet QoS requirements.

To prevent users in poor conditions from degrading the services of other users in the same sector, the invention monitors the time slot usage of each active user 106 in the sector 104 and detects if any of the users is using resources over a predetermined hogger threshold. If so, the base station 102 will temporarily stop providing QoS enforcement for the resource hogging user so that more time slots can be allocated to other users. Once the resource hogger's usage drops below the predetermined threshold, the base station 102 resumes QoS enforcement for that user.

One specific method 200 of carrying out the invention is explained below with respect to FIG. 2. The base station 102 tracks the percentage of timeslots allocated to a particular user according to the following relationship:

$$TS_i(n) = \begin{cases} 1, & \text{if \_the\_user\_i\_is\_allocated\_to\_timeslot\_n} \\ 0, & \text{otherwise} \end{cases} \quad \text{(Equation 1)}$$

where i identifies a user in the sector and n identifies a particular timeslot. Equation 1 simply assigns a binary value to $TS_i(n)$ for each timeslot n to indicate whether user i is allocated that particular timeslot n. This allows the system to track which user is using a particular timeslot at any given time.

Once timeslot usage has been gathered over time, an average timeslot usage $TSUsage_i(n)$ for each particular timeslot n by each user i can be obtained (block 202) as follows:

$$TSUsage_i(n) = \frac{(M-1) * TSUsage_i(n-1) + TS_i(n)}{M} \quad \text{(Equation 2)}$$

where M is a forgetting factor or sliding window that allows the TSUsage value to be updated dynamically. Equation 2 reflects the portion of the system resources that a particular user i has used via an auto-regressive moving average (ARMA) filter. Equation 2 also acts as an exponentially decaying smoothing function used by the base station 102 for many of the parameters it evaluates. In short, the value obtained in Equation 2 acts as a foundation for making decisions on resource usage.

The base station 102 can also track the number of active users N(n), that is the number of users competing for a particular timeslot n, and the average number AveN(n) (block 204) of active users over the sliding window M, calculated according to the following Equation 3:

$$AveN(n) = \frac{(M-1) * AveN(n-1) + N(n)}{M} \quad \text{(Equation 3)}$$

Once the average timeslot usage has been calculated (block 202), the process uses the average timeslot usage TSUsage to determine if a particular user i is a resource hogger in timeslot n via the following comparison:

$$TSUsage_i(n) > h_i(n) \quad \text{(Equation 4)}$$

where $h_i(n)$ is the hogger threshold (block 206). The specific way in which the hogger threshold is determined can vary based on the desired characteristics of the resource allocation system. Possible options are:

$$h_i(n) = \frac{c}{N(n)} \quad \text{(Equation 5)}$$

$$h_i(n) = \frac{c}{AveN(n)} \quad \text{(Equation 6)}$$

$$h_i(n) = c \quad \text{(Equation 7)}$$

where c is a predefined threshold corresponding to a maximum allowable degree of timeslot overuse. Equation 5 reflects a maximum threshold based on the number of active users N in the sector at the time of evaluation. Thus, the value for Equation 5 can fluctuate rapidly as the number of active users fluctuates. Equation 6 reduces fluctuations in the hogger threshold value by setting the threshold based on an average number of users AveN(n), as calculated in Equation 3. Thus, if the number of users N fluctuates during the sliding window M, the hogger threshold will not fluctuate as fast as N. Equations 5 and 6 both indicate that the maximum timeslot usage that any single user can have depends on the number of active users (instantaneous or average) competing for time slots. Equation 7, on the other hand, indicates the maximum absolute timeslot usage in the sector, regardless of the number of users competing for shared resources.

If a given user is identified as a user staying within allocation limits in the comparison (block 206), the base station 102 continues target QoS enforcement for that user in that timeslot (block 208). If the time slot usage TSUsage for a given user in time slot is above the hogger threshold (block 206), however, then the user is considered a resource hogger. The base station 102 then temporarily suspends target QoS enforcement for that user for that time slot (block 210). In other words, the base station 102 decides that the resource hogger user has used too many system resources to make target QoS enforcement possible. To relieve this problem, the base station 102 simply stops target QoS enforcement on the resource hogger and reallocates resources to the target QoS enforcement for the remaining active users.

The process is then repeated for each timeslot. Because resource hogging is evaluated at each time slot, and because a resource hogger will not receive as many system resources as other users due to the suspended target QoS enforcement, a user identified as a resource hogger in one time slot will eventually receive target QoS enforcement again once its resource use drops to acceptable levels.

Figure 3:
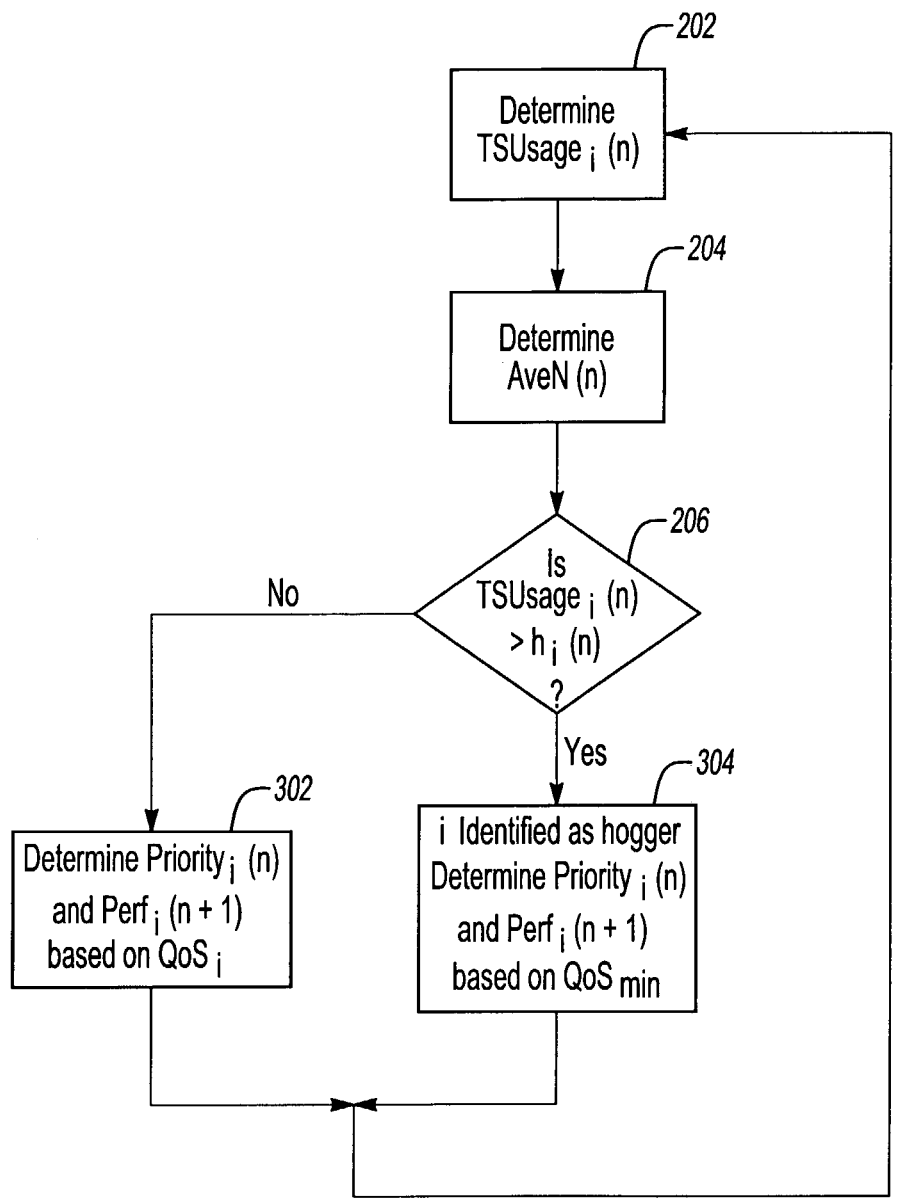
FIG. 3 is a flow diagram illustrating a resource control method according to another embodiment of the invention.

FIG. 3 illustrates one embodiment of the inventive process in greater detail. Steps that are the same as those shown in FIG. 2 are given the same reference numerals in FIG. 3. In this embodiment, it is assumed that the target QoS requirement set for a given user i is defined as:

$$QoS_i = \{q_1^i, q_2^i, \ldots, q_L^i\} \quad \text{(Equation 8)}$$

where $q_j^i$ corresponds to different QoS parameters (e.g., throughput, latency, jitter, etc.). Each target QoS requirement $q_j^i$ for each user i is set at a particular level, but the system also uses minimum QoS requirements $q_j^{min}$ below the corresponding target requirements $q_j^i$. The set of such minimum QoS requirements is:

$$QoS_{min} = \{q_1^{min}, q_2^{min}, \ldots, q_L^{min}\} \quad \text{(Equation 9)}$$

where L is the number of QoS requirements. The performance, in a particular, QoS performance, actually realized by the end user is expressed by a set of performance variables $Perf_i(n)$:

$$Perf_i(n) = \{p_1^i(n), p_2^i(n), \ldots, p_K^i(n),\} \quad \text{(Equation 10)}$$

which are calculated in each timeslot n. The number of performance variables K in Equation 10 may, in general, be different from the number of QoS requirements L in Equation 9. This is possible when, for example, K performance variables include L variables directly tracking the actual realized QoS performance corresponding to L QoS parameters as well as some additional auxiliary performance variables.

The base station 102 allocates resources for each timeslot n via a scheduling algorithm user_selection(n), which can be expressed generally as:

$$user\_selection(n) = argmax_i\{Priority_i(n)\} \quad \text{(Equation 11)}$$

As can be seen in Equation 11, the scheduler algorithm user_selection(n) is a function (e.g., argmax in this example) of a priority value $Priority_i$ assigned to each active user i. The scheduler algorithm user_selection(n) then schedules service for each user based on the $Priority_i$ values; for example, users having higher $Priority_i$ values will be serviced before users having lower priority values. In this example, the operating condition affecting system performance is the RF condition of each user, which is represented by the user data rate or determined by the base station. The RF condition for a given user is represented by a data rate control (DRC) rate; a higher DRC rate implies a better RF condition, while a lower DRC rate implies a worse RF condition requiring greater system resources to meet QoS requirements. The priority for each active user i in time slot n is evaluated as a function f of the QoS requirements $QoS_i$ for that user, the performance $Perf_i(n)$ realized by the user i and the user's RF condition $DRC_i$ as follows (block 302):

$$Priority_i(n) = f\{QoS_i, Perf_i(n), DRC_i(n)\} \quad \text{(Equation 12)}$$

The priority can be calculated in any way, using any desired function f of the QoS requirements $QoS_i$, user-realized performance $Perf_i(n)$, and user RF condition $DRC_i(n)$. The user-realized performance is updated on a per timeslot basis as follows (block 302):

$$Perf_i(n+1) = g\{QoS_i, Perf_i(n), Action_i(n)\} \quad \text{(Equation 13)}$$

where $Action_i(n)$ is the action (e.g., user selection and transmission rate) chosen by the scheduler in slot n with respect to user i. As can be seen in Equation 13, the user-realized performance $Perf_i(n+1)$ is updated for the next time slot n+1 using an arbitrary desired function g of the QoS requirements $QoS_i$, the previous performance of the user $Perf_i(n)$, and the scheduler action taken in previous slot n. The information that is included in $Action_i(n)$ can vary depending on which performance variables are included in $Perf_i$. For example, if the base station 102 decides to service the highest priority user with a very high data rate in a given timeslot n, that service will be considered an action for that user i in that timeslot n (i.e., $Action_i(n)$) and will impact that user's performance $Perf_i(n+1)$ in the next timeslot, potentially changing the calculated Priority value for that user in the next timeslot n+1 as well.

Note that before the priority calculation and $Perf_i$ update take place, the base station 102 first checks to see if any of the users is a resource hogger (block 206). If so, the base station 102 downgrades the priority of the resource hogger user. As a result, the base station 102 will not enforce the target QoS requirements $QoS_i$ for the resource hogger user in that timeslot. Instead, the base station will use the minimum QoS requirements $QoS_{min}$ when calculating priority and when updating the user performance (block 304). In other words, the system temporarily gives up the target QoS enforcement for the resource hogger.

The above steps are repeated on a per timeslot basis. Because the suspended target QoS enforcement for the resource hogger affects its performance by virtually preventing the resource hogger from accessing any resources, performance updates (block 304) will bring the resource hogger back to non-hogger status, allowing its priority to be evaluated the same way as normal active users using the target, and not the minimum QoS requirements.

By temporarily suspending target QoS enforcement for resource hoggers and allocating the remaining resources to other users, the invention prevents resource hoggers from causing poor performance in the entire system. Although the invention does degrade the performance of a small number of users in poor RF conditions, the hogger threshold can be selected to minimize the number of users identified as resource hoggers while still allowing the target QoS to be enforced more effectively for the majority of users. This strikes a balance between target QoS enforcement and system performance optimization. Further, the inventive method allows the hogger threshold to be adjusted so that system performance can be adjusted to match specific requirements of particular wireless service providers.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, this method, system and portions thereof and of the described method and system may be implemented in different locations, such as network elements, the wireless unit, the base station, a base station controller, a mobile switching center and/or radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

We claim:

1. A method of controlling resource allocation in a wireless communication system, comprising:
   determining whether at least one user is a hogger based on a timeslot usage by comparing the timeslot usage of said at least one user with a hogger threshold; and
   suspending target QoS requirement enforcement for said at least one user if said at least one user is determined to be a hogger;
   wherein the hogger threshold is at least one of
   based on an average number of users determined over a sliding window containing a plurality of timeslots, or
   based on an actual number of users accessing the system at a time corresponding to the timeslot usage of the at least one user.

2. The method of claim 1, wherein the determining step comprises calculating an estimated timeslot usage over a sliding window containing a plurality of timeslots.

3. The method of claim 2, comprising calculating the average number of users over the sliding window.

4. The method of claim 1, wherein the suspending step comprises using a minimum QoS requirement enforcement for the hogger.

5. The method of claim 1, comprising:
   enforcing a target QoS requirement for at least one of a plurality of users that is not identified as the hogger; and
   updating a user-realized performance for said at least one of the plurality of users not identified as the hogger.

6. The method of claim 5, comprising:
   determining a priority for said users not identified as the hogger based on the target QoS requirement; and
   determining a priority for the hogger based on the minimum QoS requirement.

7. The method of claim 6, wherein the updating step comprises:
   updating the user-realized performance for said plurality of users not identified as the hogger based on the target QoS requirement; and
   updating the user-realized performance for said plurality of users identified as the hogger based on the minimum QoS requirement.

8. The method of claim 5, comprising
   simultaneously performing the enforcing and the suspending.

9. The method of claim 1, comprising
   maintaining a quality of service requirement enforcement for at least one other user while suspending the target quality of service requirement enforcement for said at least one user.

10. The method of claim 1, comprising
tracking time-slot usage of each active user in a sector; and
determining whether the time-slot usage of any active user reaches a predetermined resource hogger threshold.

11. The method of claim 10, comprising:
determining the time slot usage for each user over a selected time period;
determining an average time slot usage for each user for the time period; and
determining whether the average time slot usage for each user exceeds the threshold.

12. A method of controlling resource allocation in a wireless communication system, comprising:
tracking time-slot usage of active users in a sector;
determining the time slot usage for the users, respectively, over a selected time period;
determining an average time slot usage for the users, respectively, for the time period; and
identifying at least one of the users as a hogger if the average time slot usage of the at least one of the users reaches a predetermined resource hogger threshold; and
suspending target QoS requirement enforcement for the at least one of the users identified as a hogger,
wherein the hogger threshold is at least one of
based on an average number of users determined over a sliding window containing a plurality of timeslots, or
based on an actual number of users accessing the system at a time corresponding to the timeslot usage of the at least one user.

13. A method of controlling resource allocation in a wireless communication system having a plurality of users, comprising:
determining whether at least one user is a hogger based on a timeslot usage and a hogger threshold;
suspending target QoS requirement enforcement for the hogger;
using a minimum QoS requirement enforcement for the hogger; and
enforcing target QoS requirements for at least one of said plurality of users that is not identified as the hogger;
determining a priority for each of said plurality of users not identified as the hogger based on the target QoS requirement; and
determining a priority for each of said plurality of users identified as the hogger based on the minimum QoS requirement,
wherein the hogger threshold is at least one of
based on an average number of users determined over a sliding window containing a plurality of timeslots, or
based on an actual number of users accessing the system at a time corresponding to the timeslot usage of the at least one user.

* * * * *